United States Patent
Heckmann et al.

(10) Patent No.: US 9,650,056 B2
(45) Date of Patent: May 16, 2017

(54) METHOD FOR CONTROLLING A DRIVER ASSISTANCE SYSTEM

(71) Applicant: HONDA RESEARCH INSTITUTE EUROPE GMBH, Offenbach/Main (DE)

(72) Inventors: Martin Heckmann, Offenbach (DE); Heiko Wersing, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 95 days.

(21) Appl. No.: 14/701,785

(22) Filed: May 1, 2015

(65) Prior Publication Data

US 2015/0344040 A1  Dec. 3, 2015

(30) Foreign Application Priority Data

May 30, 2014   (EP) .................................... 14170563
Oct. 31, 2014   (EP) .................................... 14191236

(51) Int. Cl.
*B60W 50/08* (2012.01)
*B60W 50/14* (2012.01)
*B60W 50/10* (2012.01)
*G10L 15/22* (2006.01)
*G10L 15/18* (2013.01)

(52) U.S. Cl.
CPC ............ *B60W 50/08* (2013.01); *B60W 50/10* (2013.01); *B60W 50/14* (2013.01); *B60W 2540/02* (2013.01); *G10L 15/1807* (2013.01); *G10L 15/22* (2013.01)

(58) Field of Classification Search
CPC ...... B60W 50/08; B60W 50/10; B60W 50/14; B60W 2540/02; G10L 15/1807; G10L 15/22

See application file for complete search history.

(56) References Cited

U.S. PATENT DOCUMENTS

| | | | |
|---|---|---|---|
| 9,085,303 B2* | 7/2015 | Wolverton | B60K 35/00 |
| 9,305,555 B2* | 4/2016 | Kato | G10L 15/22 |
| 2005/0171675 A1 | 8/2005 | Sawamoto et al. | |
| 2006/0004486 A1 | 1/2006 | Yoshikawa et al. | |
| 2012/0001771 A1* | 1/2012 | Roth | B60W 50/14 340/905 |
| 2013/0262117 A1 | 10/2013 | Heckmann | |

FOREIGN PATENT DOCUMENTS

| | | |
|---|---|---|
| DE | 10 2009 019 702 A1 | 11/2009 |
| DE | 10 2012 201 934 A1 | 8/2013 |
| EP | 1 807 267 B1 | 8/2008 |

OTHER PUBLICATIONS

European Search Report dated Feb. 2, 2015 corresponding to European Patent Application No. 14191236.0.

* cited by examiner

*Primary Examiner* — Todd Melton
(74) *Attorney, Agent, or Firm* — Squire Patton Boggs (US) LLP

(57) ABSTRACT

The invention relates to a method for controlling a driver assistance system comprising the steps of providing information on an environment of a host vehicle, receiving a spoken instruction from a host vehicle driver, generating an attention delegation task for evaluation of the provided information from the spoken instruction, performing evaluation of provided information in accordance with said attention delegation task and outputting a result of the evaluation.

15 Claims, 2 Drawing Sheets

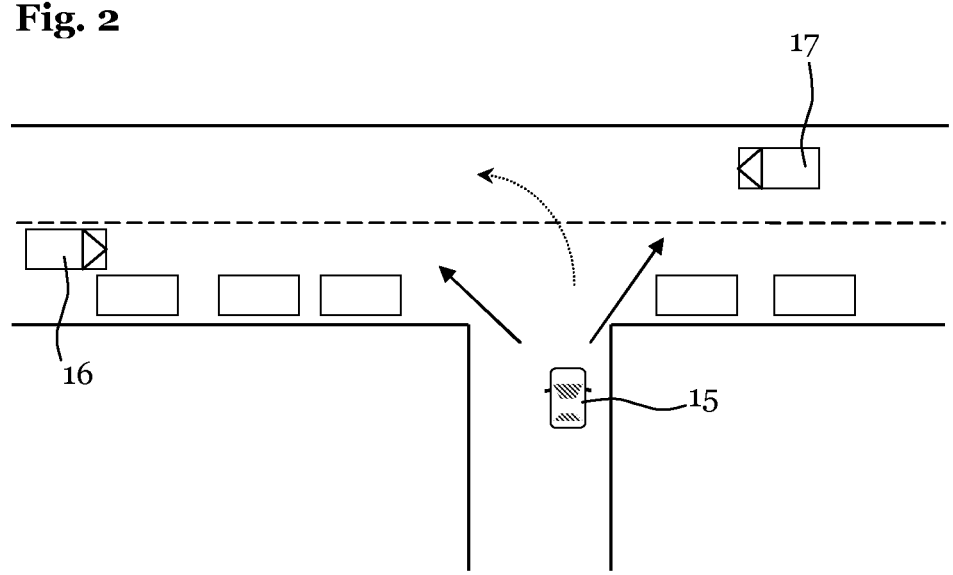
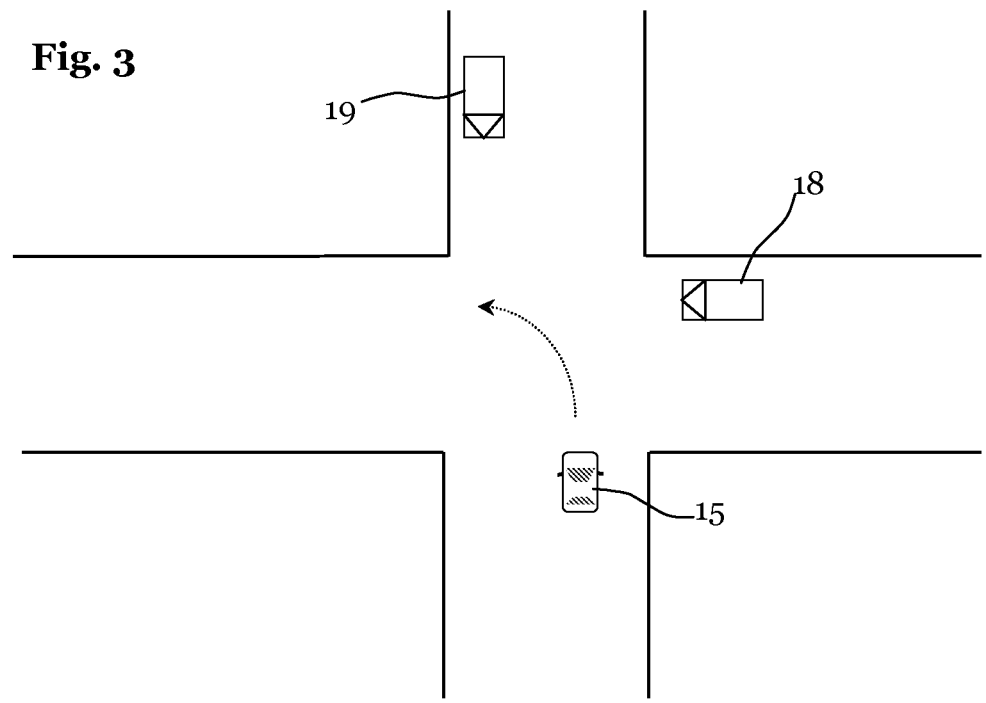

METHOD FOR CONTROLLING A DRIVER ASSISTANCE SYSTEM

BACKGROUND

Field

The invention relates to a method for controlling a driver assistance system.

Description of the Related Art

During the last years driver assistance systems have been rapidly developed in order to increase the comfort for a driver and also the safety of driving. This is in particular important, because the traffic density increased over the years and thus, in everyday driving a driver is frequently faced with truly complex traffic situations. In such situations it is advantageous if the driver is assisted by a driver assistance system so that responsibility for perceiving the traffic situation does not lie with the driver only.

Such driver assistance systems are capable of sensing the environment around a vehicle. In order to do so the vehicles are equipped with sensors like radar or lidar sensors or with image processing systems that include a camera and which are capable of recognizing objects in the environment of the vehicle. Such systems are in most cases mounted on the vehicle in a distributed fashion so that a 360° surveillance around the vehicle is possible. Of course, such a 360° surveillance exceeds any attention a human driver may pay.

Another source of information which can be used by driver assistance systems is a car-to-x communication so that a vehicle in the environment of the host vehicle of the system does not necessarily need to sense any objects in its environment on its own. Based on this information a driver assistance system performs an evaluation of the scene and based on a fixed scheme gives warnings or notifications to the driver. Since the driver assistance systems become more and more advanced vast information has to be presented to the driver in particular when a close cooperation between the driver and the system is necessary. This is for example the case when a semi-automatic driving shall be made where driver and assistance system together solve challenges of the driving task.

In current systems the driver is always the last instance and information is provided for example by presenting an icon so that the driver easily can recognize the reason for the presented warning. Due to improved situation models, prediction models and evaluation of a sensed traffic scene in general the amount of information that is presented to the driver also increases. Thus, the results of the analysis of the traffic situation lead to an unwanted distraction of the driver because he is demanded to check what kind of notification or warning is presented, then to decide if this warning or notification is relevant for his intended further driving behavior and act accordingly. Thus, contrary to the original intention of the driver assistance system the driver may be disturbed and his concentration badly affected.

In order to reduce the bad affect for the driver modern systems use head-up displays which often use some form of augmented reality. Nevertheless, the presented objects may have been recognized by the driver already. Thus, the driver receives an additional warning which is unnecessary but obtrusive and redundant. This might lead to a bad acceptance of such systems and finally the driver may deactivate the systems.

There have been presented some suggestions that use knowledge about a driver attention state which is obtained by monitoring overall awareness versus drowsiness levels of the driver. Alternatively, the viewing angle of the driver or an estimated distraction according to current entertainment usage or cell phone usage may be a basis for a threshold level which is used to determine whether a driver shall be notified or warned. Examples for such approaches can be found in KR 2011/0144720 or DE 10 2012109 297 A1.

Furthermore, it has been described that the driver himself can manually adapt the threshold meaning the risk level when a warning is output by a system. But as described in DE 10 2012 201 934 A1 this is a general setting for the system which does not take account of a current traffic situation of the host vehicle. Up to now there are mainly used general settings which are basically input by a user using a human machine interface of the car which basically consists of touch screens, buttons and control knobs. But the presently known human machine interfaces are not suitable to adapt the performance and the behavior of the system depending on a currently experienced traffic situation. Thus, the input of a general setting regarding risk level for example may either result in the driver feeling upset because of a load of information which is to high or that in cases where assistance would be highly recommended a risk level that is set to a relatively high value will avoid that helpful information is output to the driver.

In EP 1807267 B1 a system for driver assistance is presented which monitors the driving situation and makes suggestions for providing active driving manoeuver assistance. Based on the environment sensing the assistance system detects a particular situation from a pre-defined catalogue of situations like parking, overtaking maneuver, or distance-controlled cruise control. For each element of the catalogue of situations there exists a number of possible suggestions that may be offered by the system depending on the current realization of the situation. The suggestions of the system can be confirmed or rejected by the driver, either actively by speech or control input, or indirectly by performing a driving action which is compatible or incompatible with the suggestion. For the evaluation of the driving situation the driver's attentiveness is taken into account.

SUMMARY

It is thus an object of the present invention to provide a method and a driver assistance system capable of providing information to the driver or activation of car controls only when considered necessary by the driver and with lowest possible impact on the attention of the driver to the traffic.

The problem is solved by the method and the driver assistance system according to the independent claims.

According to the method for controlling the driver assistance system in the first place information on an environment of a host vehicle is provided. This information can be obtained for example by a car-to-x communication system or be the output of sensors that are mounted on the host vehicle on which the driver assistance system is mounted. A plurality of sensors can be used in order to realize the capability of a 360° surveillance of the vehicle. Even a mixture of sensors of different types can be used, for example a radar system for object detection and an image processing system including a camera for analysis of traffic signs, traffic lights, lane markings and so on. An evaluation of a traffic scene will be performed on the basis of the provided information. Already known systems are capable of using information provided from a plurality of sources.

According to the inventive method and system a spoken instruction from a host vehicle driver is received by the system. On the basis of this spoken instruction an attention delegation task is generated. The attention delegation task defines an evaluation of the provided information which means that contrary to the systems that are known from the state of the art an evaluation of provided information is not performed automatically with respect to preference settings but only upon reception of a spoken instruction. The attention delegation task that is generated from such spoken instruction defines the manner of evaluation. The evaluation that is carried out by the system is then performed in accordance with the attention delegation task and using the provided information. Finally, a result of the evaluation is output.

The inventive system has the big advantage that a spoken instruction can be given by the host vehicle driver easily even in situations where the traffic situation needs the full attention of the driver. Speaking is done very intuitively by a person and in particular does not need any attention to the human machine interface. Consequently, depending on the traffic situation which is recognized by the driver, an instruction can be given to the driver assistance system. This means that in any situation where no particular assistance from the driver assistance system is needed by the driver, no bothering of the driver by unwanted notifications or warnings can occur. Necessarily this will lead to an improved acceptance of such systems and such systems that provide information only on demand will therefore increase the safety benefit to a large extent.

In the current invention minimal distraction of the driver is achieved via a speech based interaction which preferably is sensitive to the current traffic situation, uses prosodic and/or other cues to perform an intuitive and highly responsive interaction, and/or incorporates knowledge of past interactions to adapt the interaction. Thereby the exact timing of the spoken interaction with respect to the current traffic situation is very important. If, for example, the attention delegation request "watch to the right" is made, while a car is just passing at the crossing from the right it makes sense to give feedback to the driver only after the car has fully passed the crossing. On the contrary, if the request is given before the own car is already standing at the crossing, a warning may be given also for car just crossing from the right.

It is also preferred to take into account a model of the current visibility of an object in the scene for the driver. If the environment sensing is capable of sensing objects beyond the normal visual range (e.g. radar sensor) then the verbalization of the speech output of the system can provide this information. For example, "fast car is coming from the far right", or "bicycle behind the parked car".

It is in particular preferred that a space of environment of the vehicle for which provided information is used for evaluation and/or for which information is provided is limited according to the attention delegation task. This means that either all provided information is used that is sensed for example by the sensors as explained above or obtained in another way and that would allow evaluation of the entire environment of the vehicle but the analysis or evaluation of this information is performed only with respect to risks/predictions or the like that occur in a space defined in the attention delegation task. Alternatively, the attention delegation task may limit the provided information to information related to a particular space defined in the attention delegation task which could also be achieved for example by using only information sensed by particular sensors that cover only a dedicated area of environment of the host vehicle. Again there is the advantage that only the desired information is presented finally to the host vehicle driver. Another benefit of such an approach is that the computational effort is reduced compared to a 360° surveillance of the vehicle in which every risk has to be estimated and analyzed although it may have been recognized already by the host vehicle's driver.

Another preferred aspect is that the evaluation of the provided information includes perception of the environment and further evaluation is then limited to perceived elements defined in the attention delegation task. Thus, the provided information in the first place can be evaluated in general so that for example a plurality of types of traffic participants can be identified in the sensed environment. The attention delegation task may then define a particular type of traffic participant, for example, a bicyclist. The further evaluation regarding the risk of collision or any other aspect of a developing traffic situation can then be limited to such perceived element. This can be particularly helpful when such type of traffic participant needs an attention level of the driver which is difficult to realize because of complex situations where the viewing angle of the driver does not allow to simultaneously watch a defined traffic participant. As an example, a bicyclist may be given which is approaching from behind when a driver intends to make a turn into the road at the right side of the current road. The driver may then focus his attention on pedestrians that want to cross the target road so that it will be difficult at the same time to look to the rear in order to recognize approaching bicyclists.

According to another aspect of the invention the attention delegation task that is generated from the spoken instruction is linked either to a current situation or to a situation in the future to be recognized based on an analysis of the provided information. Thus, the attention delegation task, in case that from the spoken instruction it is determined that an immediate evaluation is possible, is performed immediately and the result of the evaluation given back to host vehicle driver. It is to be noted that in general the output of a result of the evaluation is preferred to be a spoken message by the system as well. This increases the intuitive approach, because again, hearing an awaited answer does not need very much concentration contrary to watching out for a visual notification. As an alternative to performing the evaluation immediately in a current situation the attention delegation task may define a situation which can be in the future and which is recognized by the system by performing a permanent analysis of the provided information, for example, it can be defined in the spoken instruction that the right side of the vehicle shall be observed when the vehicle approaches the next crossing. The situation in the future would then be approaching a next crossing and the system would analyze the provided information in order to determine existence of such a crossing and the host vehicle approaching this crossing. Then the system would automatically evaluate the provided information with respect to a risk occurring at the right side of the vehicle, for example, a vehicle approaching from the right.

It is furthermore preferred that independent from any controlling of the driver assistance system additionally the provided information is analyzed for particularly critical situations. In case that such a particularly critical situation is recognized a warning is output. This can be for example a situation where the driver assistance system recognizes that a collision may be the result of the further development of the current situation without immediate reaction of the driver.

According to another preferred aspect a condition for performing the evaluation according to the attention delegation task only under in certain situations, defined in the condition is generated from the spoken instruction. Thus, from the spoken instruction not only the attention delegation task itself is generated but also a condition is interpreted that triggers the conduction of the attention delegation task. The system is thus capable to extract the delegation task itself but also an information on the point in time when such delegation task shall be performed.

Furthermore, it is preferred that the output includes information on a confidence of the evaluation result. Thus, in particular if the output is given by a comment the wording may express a confidence level. This can even be improved by using prosodic variations as an indication of confidence. Again this enhances the intuitivity of the system, because an emphasized warning of a comment will be taken serious by the host vehicle driver for example. The output should also allow an immediate feedback to the driver, if the attention delegation request was properly understood. This means that the leading phrases of the speech output allow a quick understanding on the driver side regarding the current activated attention delegation function.

To further improve the comfort it is furthermore preferred that the generated attention delegation tasks that are generated from spoken instructions are stored by the driver assistant system. The generated attention delegation tasks are stored associated with a traffic scene context in which the spoken instruction leading to the stored attention delegation task is received. Based on the stored attention delegation tasks and a current traffic scene context the likeliness that in the current situation a similar attention delegation task is advantageous or wanted is estimated. In a particularly preferred embodiment such an attention delegation task for which a likeliness above a predetermined threshold is estimated is either automatically processed or is suggested to the host vehicle driver. Thus, in situations that occur regularly and where a driver usually gives spoken instructions that lead to the same attention delegation task it can be expected that in a comparable situation the driver also needs this particular way of assistance. An example may be a crossing that is passed regularly by the host vehicle and every time the vehicle approaches to the crossing the attention delegation task of monitoring road entrance is generated. Even if the host vehicle driver does not explicitly give a respective spoken instruction it can therefore be assumed that he needs again assistance. Depending for example on preferences set by the host vehicle driver the system may then suggest to perform this action, for example, by outputting a speech information announcing the suggested attention delegation task "watch out road entrance at right side?". Such a suggestion may only be confirmed by the host vehicle driver by simply answering "yes". Alternatively—based on preferences set by the host vehicle driver—the system may automatically perform such a likely attention delegation task. The triggering of a suggestion by the system or the automatic evaluation of the attention delegation task may also be influenced by the time of day, road conditions, weather or other conditions.

To reduce the distraction of the driver and to improve the comfort it is preferred that the spoken interaction with the driver is intuitive and highly responsive as well as adapted to the individual driver. In the current invention this can be achieved on one hand by incorporating a prosodic analysis of the speech signal and by an adaptation to the speaker and the situation via the evaluation of previous interactions.

By means of the prosodic analysis different aspects can be achieved. Based on the prosodic analysis and other methods it is possible to detect the end of an utterance quicker than in conventional methods which rely on the detection of pauses. Thereby the interaction is faster and better suited to an operation of the system in complex traffic environments. This improved end-of-utterance detection can e.g. be achieved via evaluating the fundamental frequency variations and the duration of the words and pauses. Additionally the prosodic analysis enables the differentiation of utterances directed to the system or to a human thereby also rendering the interaction more responsive and intuitive, i.e. the user does not have to press a button or similar to address the system. Another aspect is that prosody allows detecting misunderstandings between the driver and the system more rapidly. When speakers correct a misunderstanding by the system they intuitively modify the prosody of the corrected word which can be used to detect these words. Furthermore, the prosodic analysis of the speech signal possibly combined with other sensors as images of the driver's face or heart rate sensors enables the determination of the driver's state as mood or stress level. Knowledge of these parameters will allow structuring the interaction accordingly, e.g. adapt the communication style and the amount of information communicated. In a situation where the driver is very stressed due to a complex traffic environment the system could instead of responding "fast car coming from the right" just say "fast car from right".

A further improvement can be obtained if the interaction style is, based on the history of previous commands, adapted to the individual speaker. Some individuals prefer a more explicit communication style where they give detailed explanations to the system and receive detailed information from the system, whereas others prefer a more implicit communication which reduces the amount of explicitly communicated information by relying more on context and prior knowledge. An example of a more implicit communication could be when a shortened command is sufficient to trigger a certain attention delegation task in a well-defined context. For example, after saying three times "watch to the right" at the same crossing, a simple command "right" will be sufficient (first only at this special crossing).

Common to all the different aspects that have been mentioned above is that the extent to which assistance is given by the advanced driver assistance system is directly influenced by the host vehicle driver, depending on the current need. This current need may be subjective and therefore vary in time significantly. The invention that will be described hereinafter by examples and making use of the attached drawings creates some kind of dialog between the host vehicle driver who gives a spoken instruction and thus request for a particular information. This approach is rather intuitive and therefore does not bother the host vehicle driver by any unwanted notification. The system only gives back the requested information in form of an evaluation result which was demanded by the host vehicle driver.

BRIEF DESCRIPTION OF THE DRAWINGS

The invention will now be described in more detail which respect to the annexed drawings in which

FIG. 2 shows an example for a traffic situation explaining the functioning of the inventive method and FIG. 3 shows a second traffic situation for explaining the invention.

DETAILED DESCRIPTION

Figure 1:
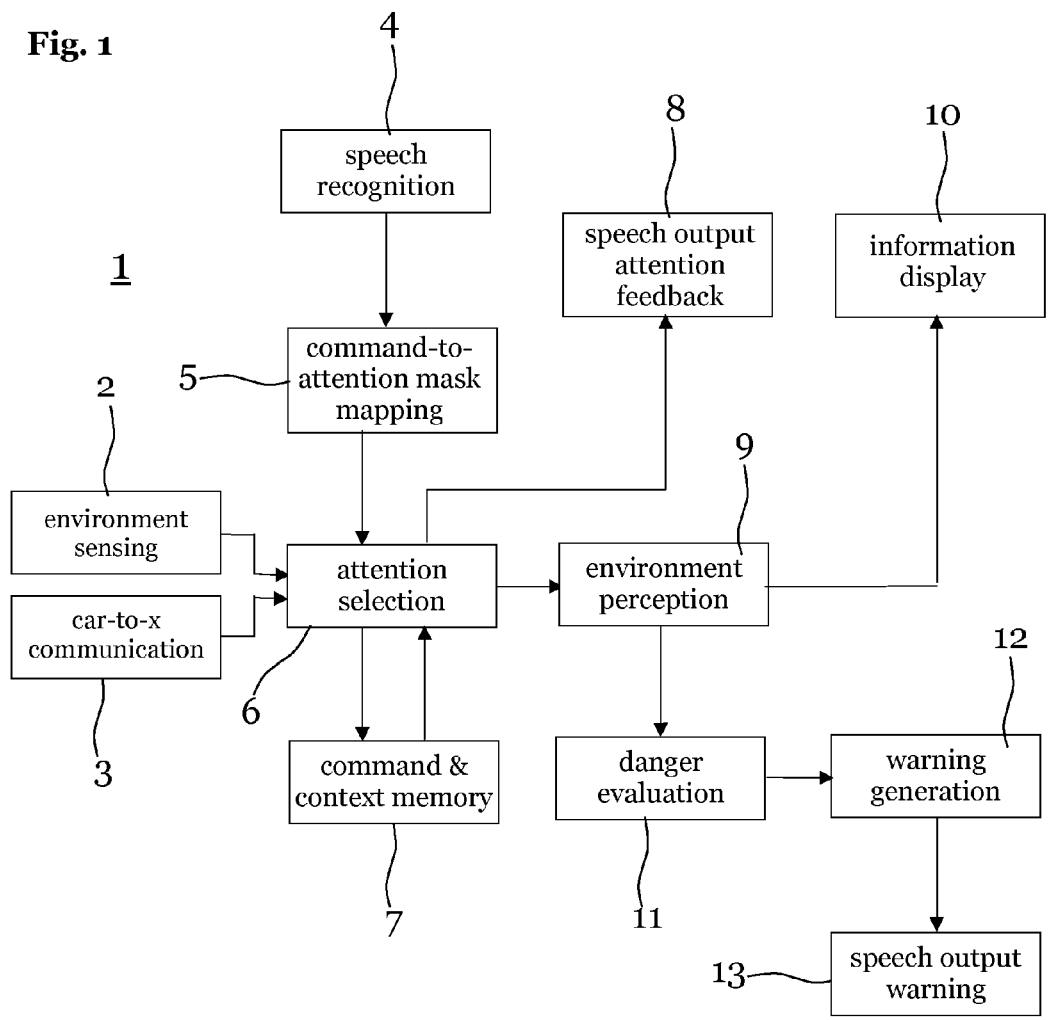
FIG. 1 shows a schematic of the layout of the entire system including the individual units that cooperate for performing the inventive method.

The system and method according to the invention will now be explained in its general steps and elements with respect to FIG. 1. In FIG. 1 there is shown a sensing means 2 that consists of at least one sensor that is provided in the host vehicle. The sensing means 2 can of course comprise a plurality of sensors that all together are capable of sensing physically the environment. Examples for such sensors can be cameras, radar sensors, laser range finders, ultrasonic sensors or time-of-flight sensors. The range of the environment which is sensed by this sensing means 2 is in most cases much larger than what the host vehicle driver can attend. For example, the range that is attendable by the host vehicle driver is limited to his visual field and thus, opposite directions can be viewed by the host vehicle driver only after turning his head. Contrary, a plurality of sensors in the sensing means 2 can be active at the same time and thus, provide information on the environment on the host vehicle for any direction and any area of the environment.

Additionally the host vehicle is equipped with other information sources 3, for example, a car-to-x communication which is a communication system that receives information on the current traffic scene from other cars or any objects that communicate with the car to transmit information about its current and future status. If information is obtained from another car which is a traffic participant, the car may for example transmit information regarding its own position or trajectory. In case that an infrastructure object, traffic lights for example, can provide information about the remaining time interval until the red light switches to green. Having such an information source included in the entire system is particularly advantageous since it delivers information the sensing means 2 cannot deliver.

The inventive system 1 furthermore comprises a speech recognition unit 4 that receives the spoken instruction from the host vehicle driver and can interpret the spoken instructions. Such instructions may be simple phrases like "watch to the right", "watch the rear", "watch oncoming traffic", "watch the car in front", and so on. These phrases describe the task that is for example an attention delegation of the driver to the system. Of course such spoken instructions need interpretation in order to filter the core request of the host vehicle driver. The spoken instructions that are to be used in such a system may be restricted in order to provide for a sufficiently robust recognition. But it is not necessary to limit it to precisely defined commands as modern speech recognition systems are capable of interpreting even more complex instruction it is also possible to use instructions like "tell me at the next crossing if there are vehicles approaching from the right" or "always inform me if there is a bicycle on my right side when I want to turn right".

From these spoken instructions the speech recognition unit generates an attention delegation task which means that the result of the interpretation is converted into clear commands that set the advanced driver assistance system up for processing this attention delegation task. As an easy example the spoken instructions could be checked for presence of key words "watch" and "right". Such an identification could then be used to generate the attention delegation task which defines an area ("right") that shall be subject to the monitoring and evaluation ("watch").

After the attention delegation task is being defined the attention delegation task is provided from the speech recognition unit 4 to a settings controller 5. In the settings controller 5 the attention delegation task is mapped on settings in the driver assistance system that are used to perform the attention delegation task. If for example only a particular area of the environment of the host vehicle is to be monitored this means that information only regarding this particular area of the environment is used. The mapping of the attention delegation task to the settings of the system can be used if only a part of the information that is provided by the sensing means 2 and/or the car-to-x communication unit or if only objects that are mentioned in the attention delegation tasks which are perceived are subject to further evaluation. The result of these settings is then supplied to an attention selection section 6 which finally controls the information sources (sensor means, car2x communication system, . . . ) on the basis of the settings given by the settings controller 5.

The previous description was based on the fact that in a current situation a spoken instruction is received from a host vehicle driver and that the attention delegation task is generated on the basis of this actual spoken instruction. During use of the inventive system the attention delegation tasks that are generated from the spoken instructions are stored. The attention delegation tasks are always stored associated with the traffic scene contact. Thus, since the driver assistance system can permanently monitor the environment and thus remember similar traffic scenarios in a current scenario the system can autonomously generate an attention delegation task that is likely to be reasonable again. The attention delegation task or the corresponding settings may then be retrieved from memory 7 and directly supplied to the attention selection unit 6. Alternatively only the attention delegation task is retrieved from the memory and supplied to the settings controller 5 that generates then the settings and feeds the same to the attention selection unit 6.

In another embodiment which is not shown in the drawings it is also possible that a repeating pattern of the traffic scene context is determined by the system but that no autonomous evaluation is performed but only a suggestion is made to the driver. Such a suggestion preferably is made by speech output. Such speech output is an information phrase from which the host vehicle driver can identify the attention delegation task that could be performed. Of course such an information phrase can be output also in case that the system autonomously performs any attention delegation task. Assuming that the attention delegation task again is the observation of a right side of a vehicle the speech output could be "Shall I look right?" or "I will look right". The general context of a traffic scene may in particular include for example information about day/night, visibility, street conditions and the like.

As already explained above, the system further includes a speech output unit 8 for outputting the information phrases.

After the system is set up according to the attention delegation task and the selection on the provided information necessary to process the attention delegation task an environment perception is conducted in the environment perception unit. The perception here is defined as a meaningful interpretation of the data received from the environment sensing and/or car-to-x communication. Algorithms for environment perception itself are already known from the prior art and thus in order to avoid unnecessary repetition a further explanation is omitted here. Based on relevant elements that are perceived by the environment perception unit like roads, traffic participants, road signs, traffic signs and so on a danger evaluation is performed in the data evaluation unit 11. It is in particular evaluated a danger caused by other traffic participants. The danger evaluation unit 11 triggers a warning in case that a risk is evaluated above a particular threshold. Alternatively if no risk can be recognized instead of a warning a notification may be generated. The generation of the warning or the notification is performed in notification/warning generation unit 12. This notification/warning generation unit converts the identified potentially risky situation into an adequate warning or safety confirmation phrase. When defining the phrases to be used it should be taken into consideration that a quick reaction must be possible as a response to the phrase. The phrase therefore should be as short as possible. Furthermore a quick and easy understanding of the phrase shall be ensured not only for correct interpretation of the system response but also to check if the originally formulated spoken instruction was understood correctly be the system.

The notification or warning that is generated is then transferred to a speech output unit 13 that generates the speech output in accordance with the generated notification/information. Here it is particularly preferred that the speech output conveys information about the confidence within the output speech comment. For example a wording like "I think there is a bicycle approaching", "There is a big truck approaching, if you drive quickly you can turn in front of him" or "The road seems to be free" could be used. The speech output can also use prosodic variations in the speech to give additional information, for example "Hmm, I am not sure . . . " or "HURRY UP!".

In FIG. 2 a first traffic scene is illustrated. Here the host vehicle 15 wants to turn left at a T-crossing. It is difficult for the host vehicle driver to monitor the entire scene which is on the other hand necessary in order to ensure safely entering the road. A plurality of cars is parked which furthermore reduces the observation range of the host vehicle driver. Thus, in such situations the driver will concentrate on the left side and watch out for approaching vehicle 16. In dense traffic the host vehicle driver will have to focus on the left side to detect a gap so that he can turn to the left side but at that time of course there must not approach a vehicle from the right side. Thus, the host vehicle driver delegates monitoring the right side to the advanced driver system by saying "watch to the right" for example. The attention delegation task that is interpreted and generated from this phrase is that the system uses its sensing capabilities to monitor the environment at the right side of the host vehicle and to evaluate the sensed traffic objects and to give a feedback after evaluation of the provided information of the sensing means. In the present case the sensing means will sense traffic object 17 which is approaching from the right side and depending on the distance between the crossing and the approaching vehicle 17 answer either "right side is free" or "vehicle approaching from the right". Of course, and as mentioned above, the phrases given back by the system can be enriched by additional information "sufficient time if you are quick" or the like.

A different traffic situation is illustrated in FIG. 3. Here we have a crossing where the driver again wants to turn to the left side. Two vehicles 18 and 19 are approaching the same crossing at nearly the same time and now the driver will focus on one of them, in the given example vehicle 18. The system is then instructed by the host vehicle driver to "watch the frontal traffic". If the system recognizes that the driver of the host vehicle 15 intends to turn left which could be done, for example by turning lights that are set to the left, could then evaluate the sensed traffic object 19 and is trajectory and respond to the instruction of the host vehicle driver by giving out the phrase "wait", if the vehicle is already close. As this example illustrates the driver assistance system only performs the attention delegation task that is given in the spoken instruction. Information regarding the traffic vehicle 18 that also could be monitored by the system is ignored or not generated at all.

The examples that have been illustrated all relate to traffic and examples are given for vehicles such as cars. But it is evident that the concept may be transferred to any warning system on a mobile vehicle that can be restricted to certain spacial subfields or subselection of objects in a scene.

Furthermore, it is of course possible that in the background the system permanently evaluates all provided information but the output is controlled on the basis of the instruction from the host vehicle driver. This gives the opportunity to determine critical situations autonomously and then output a warning message independent from a respective instruction from a host vehicle driver. For example in the situation that is illustrated in FIG. 3 it could be assumed that the road on which the host vehicle 15 and traffic object 19 drive has priority over the road on which traffic object 18 approaches. If a behavior prediction unit of the driver assistance system nevertheless recognizes that traffic object 18 will not be able to stop before entering the crossing a warning could be output although the system was not instructed accordingly by the host vehicle driver.

The invention claimed is:

1. A method for controlling a driver assistance system comprising the steps of:
   providing information on an environment of a host vehicle;
   receiving a spoken instruction from a host vehicle driver;
   generating an attention delegation task for evaluation of the provided information from the spoken instruction;
   performing evaluation of provided information in accordance with said attention delegation task; and
   outputting a result of the evaluation; wherein
      generated attention delegation tasks that are generated from spoken instructions are stored associated with a traffic scene context in which the spoken instruction is received and a likeliness is estimated from the stored attention delegation tasks, the corresponding spoken instructions, and a current traffic scene context; and
   in case a likeliness that exceeds a predetermined threshold is estimated, the attention delegation task is automatically processed or is suggested to the host vehicle driver.

2. The method according to claim 1, wherein
the timing or wording of the spoken utterance in relation to the current environment information is used.

3. The method according to claim 1, wherein
a space of the environment for which provided information is used or for which information is provided is limited according to the attention delegation task.

4. The method according to claim 1, wherein
evaluation of provided information includes perception of the environment and further evaluation is limited to perceived elements defined in the attention delegation task.

5. The method according to claim 1, wherein
the attention delegation task is linked to a current situation or to a situation in the future to be recognized based on an analysis of the provided information.

6. The method according to claim 1, wherein
the provided information is analyzed for critical situations and that a warning is output when such critical situation is identified.

7. The method according to claim 1, wherein
a condition for performing the evaluation according to the attention delegation task is generated from the spoken instruction.

8. The method according to claim 1, wherein
the output includes information on a confidence of the evaluation result.

9. The method according to claim 8, wherein
prosodic variations are used as an indication of confidence in a spoken message being the output.

10. The method according to claim 1, wherein
a prosodic analysis of the speech signal of the driver is performed and possibly combined with other information channels to achieve any of the following
an improved end of utterance detection,
a differentiation of utterances directed to the system from those directed to a human, and
an evaluation of the driver's state like mood or stress level.

11. The method according to claim 1, wherein
based on the stored spoken instructions associated with a traffic scene the interaction style with the user is adapted.

12. The method according to claim 11, wherein
an abbreviated spoken instruction is sufficient to trigger a particular attention delegation task.

13. The method according to claim 1, wherein
attention delegation task is carried out with reference to a model of the visibility of the current traffic scene for the human driver in order to deliver an appropriate speech output for the attention delegation task.

14. An advanced driver assistance system,
configured to carry out the method according to claim 1.

15. A vehicle, equipped with the advanced driver assistance system according to claim 14.

* * * * *